United States Patent [19]

Uchida et al.

[11] Patent Number: 5,038,878
[45] Date of Patent: Aug. 13, 1991

[54] VARIABLE ASSIST POWER STEERING APPARATUS

[75] Inventors: Ko Uchida, Sagamihara; Hirohide Kai, Fujisawa, both of Japan

[73] Assignee: Nissan Motor Co., Ltd., Yokohama, Japan

[21] Appl. No.: 427,350

[22] Filed: Oct. 27, 1989

[30] Foreign Application Priority Data

Oct. 28, 1988 [JP] Japan ............................... 63-272094
Oct. 28, 1988 [JP] Japan ............................... 63-272095

[51] Int. Cl.⁵ .............................................. B62D 5/06
[52] U.S. Cl. .................................... 180/142; 180/141; 91/375 A
[58] Field of Search ....................... 180/141, 142, 143; 91/375 A

[56] References Cited

U.S. PATENT DOCUMENTS

| | | | |
|---|---|---|---|
| 4,465,098 | 8/1984 | Bacardit | 137/625.21 |
| 4,465,099 | 8/1984 | Kervagoret | 137/625.23 |
| 4,512,238 | 4/1985 | Bacardit | 91/370 |
| 4,561,516 | 12/1985 | Bishop et al. | 180/142 |
| 4,561,521 | 12/1985 | Duffy | 180/142 |
| 4,565,115 | 1/1986 | Bacardit | 91/375 |
| 4,570,735 | 2/1986 | Duffy | 180/142 |
| 4,594,936 | 6/1986 | Bacardit | 91/51 |
| 4,665,798 | 5/1987 | Bacardit | 91/371 |
| 4,771,841 | 9/1988 | Uchida et al. | 180/142 |
| 4,830,131 | 5/1989 | Miyoshi et al. | 180/141 |
| 4,852,462 | 8/1989 | Uchida et al. | 91/375 |
| 4,860,635 | 8/1989 | Uchida et al. | 91/375 A |
| 4,860,846 | 8/1989 | Uchida et al. | 180/142 X |

FOREIGN PATENT DOCUMENTS

| | | |
|---|---|---|
| 10041887 | 12/1981 | European Pat. Off. . |
| 0112209 | 6/1984 | European Pat. Off. . |
| 0245794 | 11/1987 | European Pat. Off. . |
| 3733102 | 4/1988 | Fed. Rep. of Germany ...... 180/143 |
| 53-93536 | 8/1978 | Japan . |
| 56-38430 | 9/1981 | Japan . |
| 61-275062 | 12/1986 | Japan . |

Primary Examiner—Charles A. Marmor
Assistant Examiner—Mitchell Bompey
Attorney, Agent, or Firm—Foley & Lardner

[57] ABSTRACT

A control valve for a variable assist power steering apparatus comprises a bypass line having one end connected to one of two parallel fluid flow paths of a distributor circuit at an inflow section thereof and an opposite end connected to the one fluid flow path at an outflow section thereof. The bypass line is arranged in parallel to primary variable flow restrictors and in series with secondary variable flow restrictors. An externally controlled variable flow restrictor is disposed in the bypass line.

12 Claims, 14 Drawing Sheets

PRIMARY VARIABLE FLOW
RESTRICTOR(1L,1R)

PRIMARY VARIABLE FLOW
RESTRICTOR(2L,2R)

SECONDARY VARIABLE FLOW
RESTRICTOR(3L,3R)

EXTERNALLY CONTROLLED
VARIABLE FLOW RESTRICTOR(4)

EXTERNALLY CONTROLLED VARIABLE
FLOW RESTRICTOR(4L,4R,5L,5R)

VARIABLE ASSIST POWER STEERING APPARATUS

BACKGROUND OF THE INVENTION

The present invention relates to a variable assist power steering apparatus and more particularly to a control valve for a variable assist power steering apparatus.

JP 53-93536 A discloses a power steering apparatus including a hydraulic operated power cylinder with a left turn and a right turn pressure chamber. A bypass line has one end connected to one of the pressure chambers and an opposite end connected to the other pressure chamber. The flow of hydraulic fluid passing through the bypass line is controlled by an externally controlled variable flow restrictor such that the rate of the flow passing through the bypass line is increased at high vehicle speed and the rate of the flow therethrough is decreased or zero at low or zero vehicle speed. In this manner, the power assist is varied in accordance with vehicle speed.

JP 56-38430 B discloses another power steering apparatus including a bypass line of the above kind.

A problem encountered with these conventional power steering apparatuses is that hydraulic fluid passing through the bypass line flows in one direction past the externally controlled variable flow restrictor during manipulation of a steering wheel counterclockwise, while it flows in the opposite direction past the externally controlled variable flow restrictor during manipulation of the steering wheel clockwise. Thus, if the externally controlled variable flow restrictor provides different characteristic on the flow hydraulic fluid passing therethrough in accordance with the direction of flow of hydraulic fluid passing through the bypass line, different steering characteristics are provided in accordance with the directions in which the steering wheel is manipulated.

SUMMARY OF THE INVENTION

An object of the present invention is to provide a control valve for a variable assist power steering apparatus which includes a bypass line through which the hydraulic fluid passes in one direction only.

According to the present invention, there is provided a control valve for a variable assist power steering apparatus. The control valve comprises; a first valve element, a second valve element, means operatively interconnecting said first and second valve elements for allowing said second valve element to displace relative to said first valve element in one direction during manipulation of the steering wheel in one direction in response to a magnitude of steering torque applied to the steering wheel and in the opposite direction during displacement of the steering wheel in the opposite direction in response to magnitude of steering torque applied to the steering wheel, said first and second valve elements defining therebetween first and second parallel fluid flow paths connected between a hydraulic pump and a reservoir tank, said first and second parallel fluid flow paths including connection portions, respectively, which are connected to the power cylinder, each of said first and second paths being divided by said connection portion thereof into an inflow section upstream the power cylinder and an outflow section downstream the power cylinder, said inflow section of said first path and said outflow section of said second path including primary variable flow restrictors, respectively, having flow areas which decrease during displacement of said second valve element relative to said first valve element in said one direction, said inflow section of said second path and said outflow section of said first path including primary variable flow restrictors, respectively, having flow areas which decrease during displacement of said second valve element relative to said first valve element in said the opposite direction, wherein said inflow and outflow sections of said second path include secondary variable flow restrictors, respectively, said secondary variable flow restrictor of said inflow section of said second path has a flow area which decreases during displacement of said second valve element relative to said first valve element in said the opposite direction, said secondary variable flow restrictor of said outflow section of said second parallel fluid circuit has a flow area which decreases during displacement of said second valve element relative to said first valve element in said one direction, said flow areas of said primary and secondary variable flow restrictors of each of said inflow and outflow sections of said second path are variable in different patterns in response to magnitude of steering torque applied to the steering wheel, the pattern of variation of said flow area of said primary variable flow restrictor of said inflow section of said first path during displacement of said second valve element relative to said first valve element in said one direction being substantially the same as the pattern of variation of said flow area of said primary variable flow restrictor of said outflow section of said first flow path during displacement of said second valve element relative to said first valve element in said opposite direction, said control valve also comprises; bypass means connected to said second path in parallel to said primary variable flow restrictors and in series with said secondary variable flow restrictors for passing hydraulic fluid therethrough in one direction only, and externally controlled means for varying the flow of hydraulic fluid passing through said bypass means in response to a predetermined variable different from the steering torque.

DETAILED DESCRIPTION OF THE EMBODIMENTS

Figure 1:
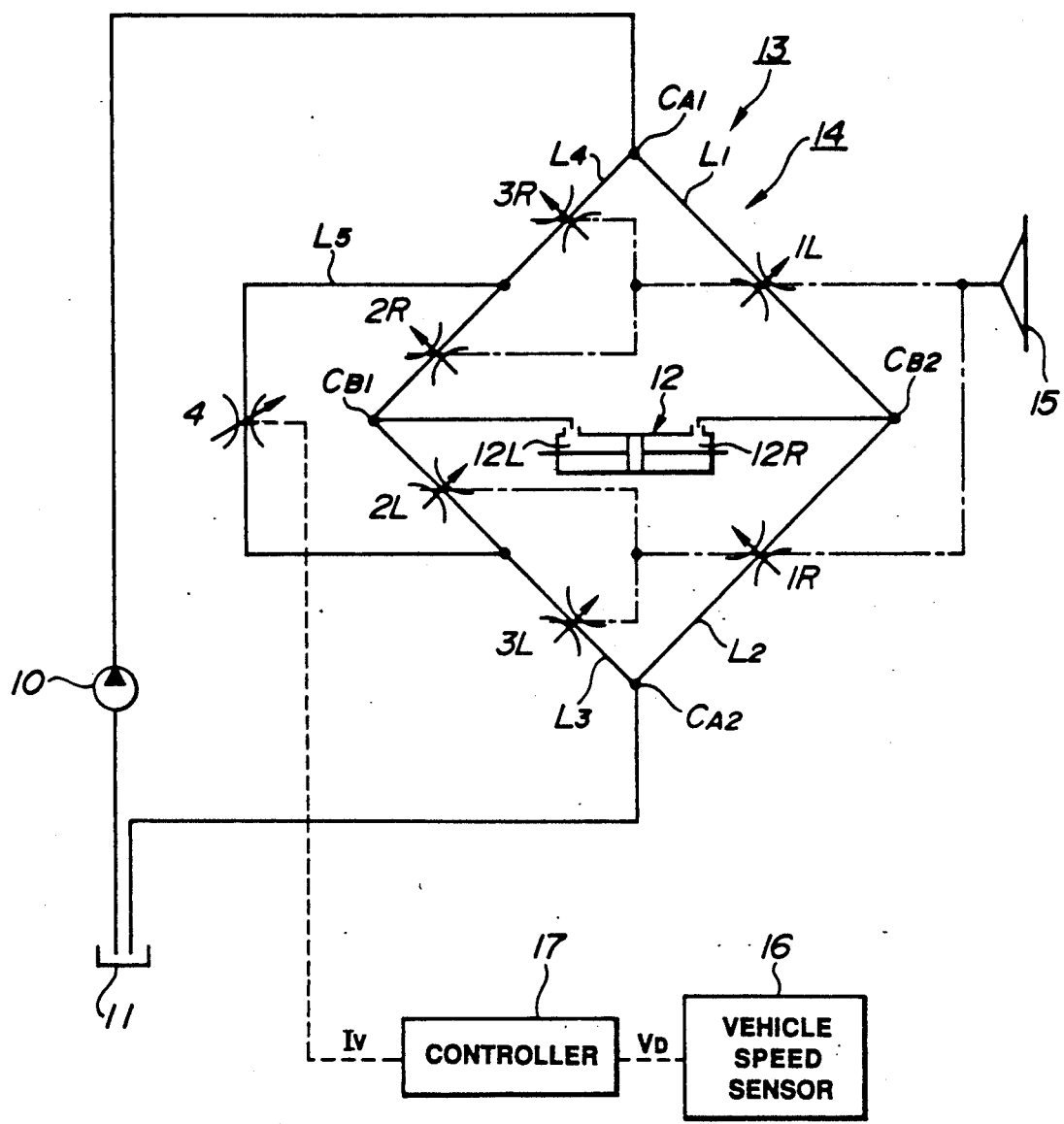
FIG. 1 is a hydraulic distributor circuit of a first embodiment of a control valve according to the present invention.

Referring to the accompanying drawings, and more particularly to FIG. 1, there is described a hydraulic circuit of the first embodiment of a control valve for a variable assist power steering apparatus according to the present invention. The power steering apparatus includes a reservoir tank 11 containing a hydraulic fluid, a pump 10 sucking in the hydraulic fluid out of the tank 11 and discharging the hydraulic fluid, a manually operable steering wheel 15, and a hydraulic operated power cylinder 12.

The control valve which is now denoted by the general reference numeral 13 is connected between the pump 10 and the reservoir tank 11 and designed to generate a pressure differential in the power cylinder 12, inducing a power assist to a vehicular steering mechanism.

As shown in FIG. 1, the control valve 13 uses a hydraulic flow distributor 14 which includes two parallel fluid flow paths, namely a first fluid flow path $L_1$-$L_2$, and a second fluid flow path $L_4$-$L_3$. The first and second fluid flow paths $L_1$-$L_2$ and $L_4$-$L_3$ are connected between the pump 10 and the reservoir tank 11. They include an inflow portion $C_{A1}$ connected to the pump 10 and an outflow portion $C_{A2}$ connected to the tank 11. They also include connection portions $C_{B2}$ and $C_{B1}$ connected to right and left turn chambers 12R and 12L of the power cylinder 12. The first path $L_1$-$L_2$ is divided by the connection portion $C_{B2}$ into an inflow section $L_1$ upstream the power cylinder 12 and an outflow section $L_2$ downstream the power cylinder 12. Likewise, the second path $L_4$-$L_3$ is divided by the connection portion $C_{B1}$ into an inflow section $L_4$ upstream the power cylinder 12 and an outflow section $L_3$ downstream the power cylinder 12.

Figure 2A:
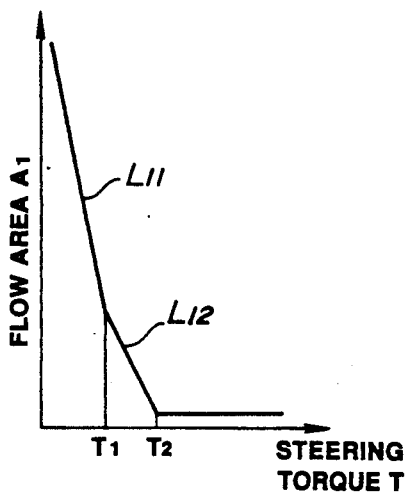
FIGS. 2(a), 2(b), 2(c), and 2(d) show how flow areas $A_1$, $A_2$, $A_3$, $A_4$ vary versus steering torque T or vehicle speed V.
Figure 2B:
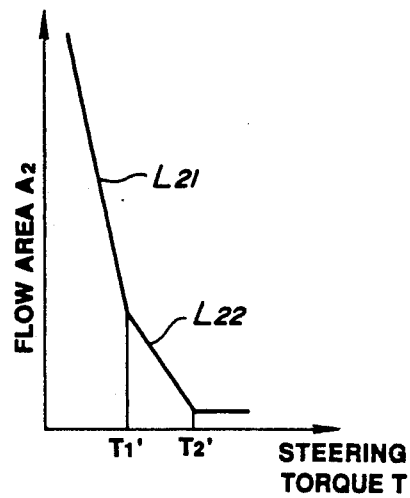

The inflow section $L_1$ of the first path $L_1$-$L_2$ and the outflow section $L_3$ of the second path $L_4$-$L_3$ include primary variable flow restrictors 1L and 2L, respectively, having flow areas $A_1$ and $A_2$ which decrease in response to magnitude of steering torque T applied to the steering wheel 15 during manipulation of the steering wheel 15 to the left or counterclockwise, see FIGS. 2(a) and 2(b). Similarly, the inflow section $L_4$ of the second path $L_4$-$L_3$ and the outflow section $L_2$ of the first path $L_1$-$L_2$ include primary variable flow restrictors 2R and 1R, respectively, having flow areas $A_2$ and $A_1$, which decrease in response to the magnitude of steering torque T applied to the steering wheel 15 during manipulation of the steering wheel 15 to the right or clockwise.

The inflow and outflow sections $L_4$ and $L_3$ of the second path $L_4$-$L_3$ include secondary variable flow restrictors 3R and 3L, respectively. The secondary variable flow restrictor 3R of the inflow section $L_4$ of the second path $L_4$-$L_3$ has a flow area $A_3$ which decreases in response to magnitude of steering torque T applied to the steering wheel 15 during manipulation of the steering wheel 15 clockwise, while the secondary variable flow restrictor 3L of the outflow section $L_3$ of the second path $L_4$-$L_3$ has a flow area $A_3$ which decreases in response to magnitude of steering torque T applied to the steering wheel 15 during manipulation of the steering wheel 15 counterclockwise, see FIG. 2(c). As will be described later in connection with FIG. 3, when the steering wheel 15 is manipulated, a torsion bar operatively disposed between two relatively displaceable valve elements is twisted to exert a reaction torque on the steering wheel 15. This reaction torque is the steering torque T. The flow areas $A_1$, $A_2$, and $A_3$ vary versus the steering torque T in different patterns.

Referring to FIG. 2(a), the flow area $A_1$ of the primary variable flow orifice 1L or 1R decreases at a high rate as the steering torque T increases from zero to a predetermined value $T_1$ as illustrated by the straight line $L_{11}$, and thereafter decreases at a less high rate as the steering torque T increases from $T_1$ to another predetermined value $T_2$ as illustrated by the straight line $L_{12}$. When the steering torque T exceeds the predetermined value $T_2$, the flow area $A_1$ decreases down to substantially zero. This means that the primary variable flow restrictor 1L or 1R is substantially closed when the steering torque T increases beyond the predetermined value $T_2$.

Referring to FIG. 2(b), the flow area $A_2$ of the primary variable flow orifice 2L or 2R decreases at a high rate as the steering torque T increases from zero to a predetermined value $T_1'$ as illustrated by the straight line $L_{21}$, and thereafter decreases at a less high rate as the steering torque T increases from $T_1'$ to another predetermined value $T_2'$ as illustrated by the straight line $L_{22}$. When the steering torque T exceeds the predetermined value $T_2'$, the flow area $A_2$ decreases down to substantially zero. This means that the primary variable flow restrictor 2L or 2R is substantially closed when the steering torque T increases beyond the predetermined value $T_2'$.

The relationship between the above-mentioned predetermined values $T_2$ and $T_2'$ is not limited to the above-mentioned example $T_1 < T_2'$. Alternatively, the relationship that $T_2 > T_2'$ or $T_2 = T_2'$ may hold.

Figure 2C:
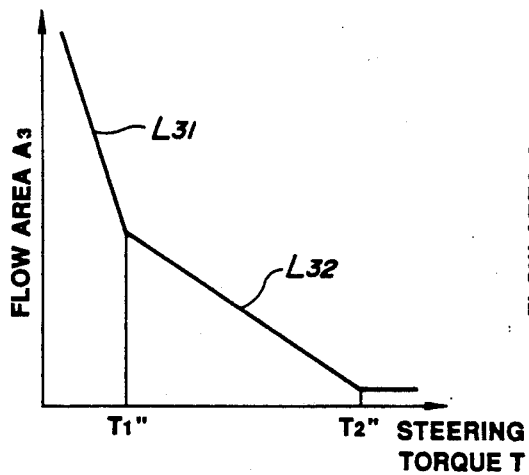

Referring to FIG. 2(c), the flow area $A_3$ of the primary variable flow orifice 3L (or 3R) decreases at a high rate as the steering torque T increases from zero to a predetermined value $T_1''$ as illustrated by the straight line $L_{31}$, and thereafter decreases at a less high rate as the steering torque T increases from $T_1''$ to another predetermined value $T_2''$ as illustrated by the straight line $L_{32}$. When the steering torque T exceeds the predetermined value $T_2''$, the flow area $A_3$ becomes substantially zero so that the primary variable flow restrictor 3L (or 3R) is substantially closed when the steering torque T increases beyond the predetermined value $T_2''$. Comparing FIG. 2(c) with FIG. 2(b), it will be noted that the predetermined value $T_1''$ is slightly greater than the predetermined value $T_1'$ and the gradient of the line $L_{31}$ is less than that of the line $L_{21}$, and that the predetermined value $T_2''$ is far greater than the predetermined value $T_2$ or $T_2'$.

In other words, during manipulation of the steering wheel 15 counterclockwise, the flow area $A_2$ of the primary variable flow restrictor 2R is always less than the flow area $A_3$ of the secondary variable flow restrictor 3R, and decreases to substantially zero at the predetermined steering torque $T_2'$ before the flow area $A_3$ of the secondary variable flow restrictor 3R decreases to substantially zero at the predetermined steering torque $T_2''$ which is greater than the predetermined steering torque $T_2'$. During manipulation of the steering wheel 15 counterclockwise, the flow area $A_2$ of the primary variable flow restrictor 2L is always less than the flow area $A_2$ of the secondary variable flow restrictor 3L, and decreases to substantially zero at the predetermined steering torque $T_2'$ before the flow area $A_3$ of the secondary variable flow restrictor 3L decreases to substantially zero at the predetermined steering torque $T_2''$.

Turning back to FIG. 1, the secondary variable flow restrictor 3R is disposed upstream the primary variable flow restrictor 2R, while the secondary variable flow restrictor 3L is disposed downstream the primary variable flow restrictor 2L. The control valve 13 includes a bypass line $L_5$ connected to the second path $L_4$-$L_3$ in parallel to the primary variable flow restrictors 2R and 2L and in series with the secondary variable flow restrictors 3R and 3L for passing hydraulic fluid therethrough. As readily seen from FIG. 1, this arrangement permits the hydraulic fluid to pass through the bypass line in one direction only. Specifically, the bypass line $L_5$ has one end communicating with the inflow section $L_4$ of the second path $L_4$-$L_3$ at a portion between the secondary and primary variable flow restrictors 3R and 2R, and an opposite end communicating with the outflow section $L_3$ of the second path at a portion between the secondary and primary variable flow restrictors 3L and 2L.

The control valve 13 also includes an externally controlled variable flow restrictor 4 for varying flow of hydraulic fluid passing through the bypass line $L_5$ in a predetermined variable, viz., a vehicle speed V, different from the steering torque T. The externally controlled variable flow restrictor 4 is controlled electromagnetically in response to solenoid current $I_V$ determined by a controller 17. The controller 17 is fed with a vehicle speed indicative sensor output $V_D$ generated by a vehicle speed sensor 16.

Figure 2D:
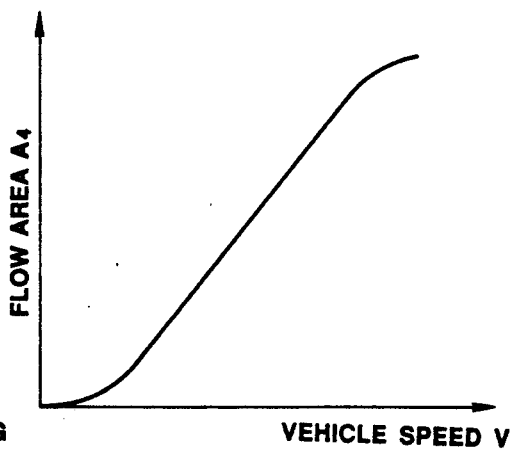

In the present embodiment, the externally controlled variable flow restrictor 4 is designed such that the flow area thereof varies in accordance with the vehicle speed that is used as one operating variable indicative of the vehicle's running condition more specifically, a vehicle speed sensor, The controller 17 is designed to vary a flow area $A_4$ of the externally controlled variable flow restrictor 4 versus vehicle speed V in a pattern as illustrated in FIG. 2(d). As shown in FIG. 2(d), the flow area $A_4$ of the externally controlled variable flow restrictor 4 gradually increases as vehicle speed V increases.

Figure 3:
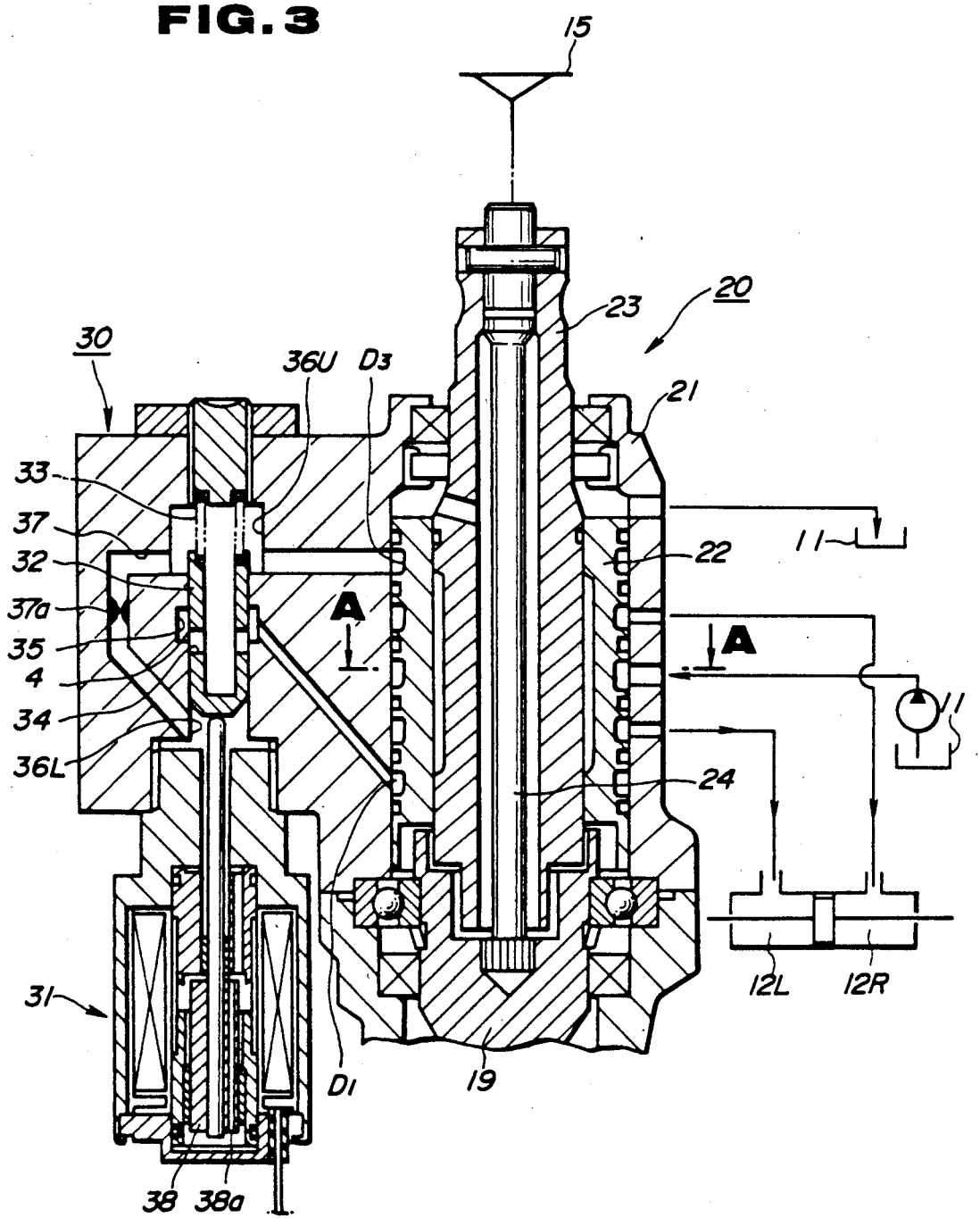
FIG. 3 is a sectional diagram of the flow control valve.
Figure 4:
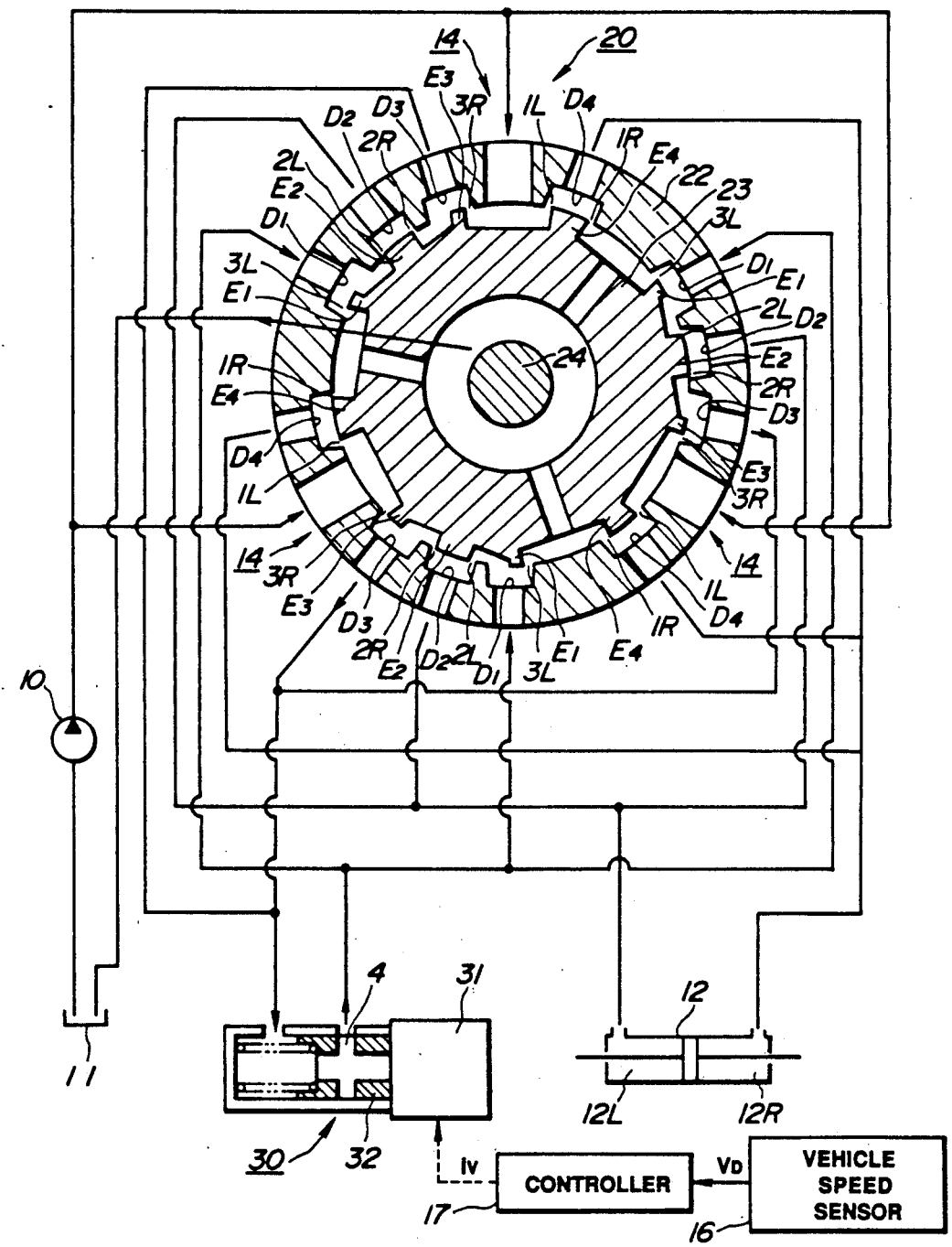
FIG. 4 is a section through the line A—A in FIG. 3.

Referring to FIGS. 3 and 4, the construction of the control valve 13 is described. The control valve 13 comprises a rotary valve 20 including a first valve element in the form of a valve sleeve 22, a second valve element in the form of a hollow valve shaft 23, and a torsion bar 24 having one end connected to the hollow valve shaft 23 and an opposite end connected to a pinion shaft 19 of a vehicular steering mechanism. The control valve 13 also includes a valve housing 21 and a spool valve 30.

The valve sleeve 22 is disposed in the valve housing 21 and has one end connected to the pinion shaft 19. The hollow valve shaft 23 is surrounded by the valve sleeve 22, and it has one end operatively connected the steering wheel 15. Extending through the hollow valve shaft 23 is the torsion bar 24 having one end connected to the steering wheel 15 and the opposite end connected to the above-mentioned pinion shaft 19. During manipulation of the steering wheel 15 counterclockwise, the torsion bar 24 operatively interconnecting the valve sleeve and shaft 22 and 23 is twisted to allow the valve shaft 23 to displace relative to the valve sleeve 22 counterclockwise, as viewed in FIG. 4 in response to the of steering torque T applied to the steering wheel 15. During manipulation of the steering wheel 15 clockwise, the torsion bar 24 is twisted in the opposite direction to allow the valve shaft 23 to displace relative to the valve sleeve 22 clockwise, as viewed in FIG. 4.

As best seen in FIG. 4, the rotary valve 20 is formed with three sets of hydraulic distributor circuits 14 equiangularly spaced 120 degrees apart.

Each of the distributor circuits 14 includes a set of four internal grooves $D_1$, $D_2$, $D_3$, and $D_4$ formed in the inner surface of the valve sleeve 22 and extending in the axial direction thereof, and a set of four lands $E_1$, $E_2$, $E_3$, and $E_4$ formed in the outer surface of the hollow valve shaft 23 and lying opposite to the grooves $D_1$, $D_2$, $D_3$, and $D_4$, respectively. Viewing in FIG. 4, the primary variable flow restrictor 1L is defined between the groove $D_4$ and a leading edge of the land $E_4$ in the counterclockwise direction, while the primary variable flow restrictor 1R is defined between the groove $D_4$ and a leading edge of the land $E_4$ in the clockwise direction. The primary variable flow restrictor 2L is defined between the groove $D_2$ and a leading edge of the land $E_2$ in the counterclockwise direction, while the primary variable flow restrictor 2R is defined between the groove $D_2$ and a leading edge of the land $E_2$ in the clockwise direction. The secondary variable flow restrictor 3L is defined between the groove $D_3$ and a leading edge of the land $E_3$ in the counterclockwise direction, while the secondary variable flow restrictor 3R is defined between the groove $D_3$ and a leading edge of the land 3R is defined between the groove $D_3$ and a leading edge of the land $E_3$ in the clockwise direction. A leading edge $E_1$ of the land $E_1$ in the clockwise direction and the groove $D_1$ define a clearance, while a leading edge of the land $E_3$ in the counterclockwise direction and the groove $D_3$ define a clearance. The setting of these clearances is made such that they will not restrict hydraulic fluid flow passing therethrough during rotation of the valve body 22 relative to the valve shaft 23.

The lands $E_3$ and $E_4$ define therebetween a groove communicating via a port formed through the valve body 22 with the pump 10, while the lands $E_1$ and $E_4$ define therebetween a groove communicating via a radial passage formed through the valve body 22 with the reservoir tank 11. The groove $D_2$ communicates via a port formed through the valve body 22 with the left pressure chamber 12L of the power cylinder 12, while the groove $D_4$ communicates via a port formed through the valve body 22 with the right pressure chamber 12R of the power cylinder 12. The groove $D_3$ communicates with an inflow side of the spool valve 30, while the groove $D_1$ communicates with an outflow side of the spool valve 30.

Referring back to FIG. 3, the valve housing 21 is formed with a valve bore for the spool valve 30. The spool valve 30 defines the flow area $A_4$ of the externally controlled variable flow restrictor 4.

This spool valve 30 comprises an electromagnetically operated solenoid 31 and a spool 32. The solenoid 31 is adapted to be energized by an electric current $I_V$ passing therethrough. The spool 32 is activated by the solenoid 31 to move against a return spring 33. The flow area $A_4$ of the externally controlled variable flow orifice 4 is defined by a diametrically extending passage 34 formed through the spool 32 and a circumferential inner groove 35 lying opposite to the diametrically extending passage 34. The spool 32 is formed with a blind ended axial bore which the diametrically extending passage 34 extends through. The spool 32 has open end defining an upper chamber 36U, as viewed in FIG. 3, which communicates with the grooves $D_3$, and a closed end defining a lower chamber 36L, as viewed in FIG. 3. These chambers 36U and 36L communicate with each other via a transfer passage 37. This transfer passage 37 is provided with an orifice 37a. The function of this orifice 37a is to delay transmission of a change in hydraulic pressure in the upper chamber 36U to the lower chamber 36L, inducing a delayed response of the spool 32 to the electromotive force generated by the solenoid 31, thus inducing a delayed response of the flow area $A_4$ of the externally controlled orifice 4 to the vehicle speed V. This is effective in preventing a rapid change in steering effort in response to a change in vehicle speed, preventing the driver from feeling an unexpected or undesired change in steering effort, providing a stable steering wheel operability by suppressing variations in steering effort even if the vehicle speed V is subject to frequent variations with relatively small amplitudes. The provision of such orifice 37a is not limited to this example. It may be disposed in a pressure balancing passage 38a of a plunger 38 slidable in the solenoid 31.

The operation of the first embodiment is described.

Let us now assume that the vehicle is at a standstill with the steering wheel 15 in its central rest position and thus dirigible wheels are kept in the straight forward position. In this state, there occurs no steering torque anywhere in the steering system. Thus, the primary variable flow restrictors 1L, 1R, 2L, 2R, and the secondary variable flow restrictors 3L, 3R are fully opened, and the flow area $A_4$ of the externally controlled variable flow restrictor 4 is zero, since the vehicle speed V is zero.

All of the hydraulic fluid discharged from the pump 10 is supplied to the hydraulic distributor circuit 14. The hydraulic fluid is evenly distributed into a branch flow passing through the first path $L_1$-$L_2$ and the other branch flow passing through the second path $L_4$-$L_3$, so that no pressure differential is generated between the pressure chambers 12L and 12R and thus no power assist is generated by the power cylinder 12. As a result, the dirigible wheels maintain their straight forward position.

If, in this state, the steering wheel 15 is turned counterclockwise, for example, the flow areas of the variable flow restrictors 1L, 2L and 3L decrease, while the variable flow restrictors 1R, 2R and 3R maintain their fully opened positions, respectively. This state of the distributor circuit 14 may be expressed by an equivalent circuit as illustrated in FIG. 5(a).

Figure 5:
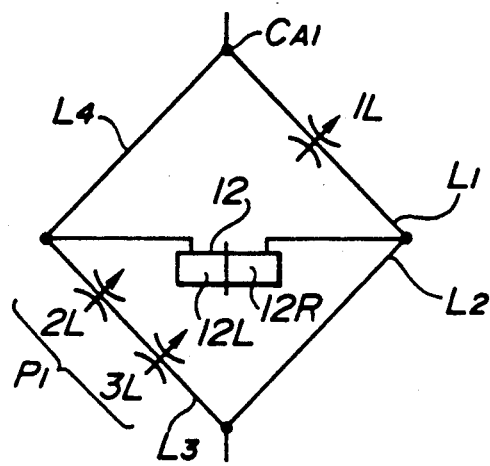
FIGS. 5(a), 5(b), and 5(c) are equivalent circuits illustrating operation of the first embodiment at zero vehicle speed.
Figure 5:
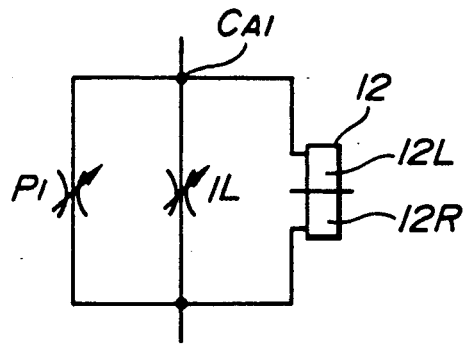
Figure 5:
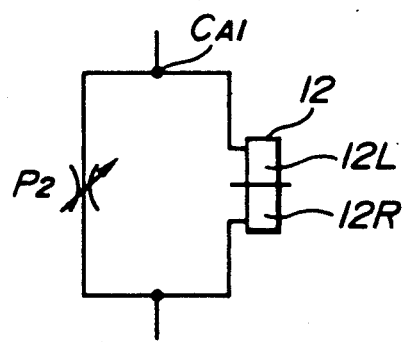

Referring to FIG. 5(a), if an attention is paid to the outflow section $L_3$ of the second path $L_4$-$L_3$, the variable flow restrictors 2L and 3L may be expressed by a single equivalent variable flow restrictor $P_1$, since they are arranged in series. The variation pattern of the flow area $A_{P1}$ of this variable flow restrictor $P_1$ versus the steering torque may be expressed by the equation (1) as follows and illustrated by a graph as shown in FIG. 6(a).

$$A_{P1} = \frac{1}{(1/S_2^2 + 1/S_3^2)^{\frac{1}{2}}} \quad (1)$$

During this counterclockwise turning of the steering wheel 15, the equivalent circuit shown in FIG. 5(a) may be converted into the circuit shown in FIG. 5(b). From FIG. 5(b), it will be noted that the primary variable flow restrictor 1L and the equivalent variable flow restrictor $P_1$ are arranged in parallel. If, now, these variable flow restrictors 1L and $P_1$ are expressed as a single variable flow restrictor $P_2$, an equivalent circuit as shown in FIG. 5(c) holds. The flow area $A_{P2}$ of this equivalent variable flow restrictor $P_2$ is expressed as the sum of the flow areas $A_1$ and $A_{P1}$ of the variable flow restrictors 1L and $P_1$.

Figure 6:
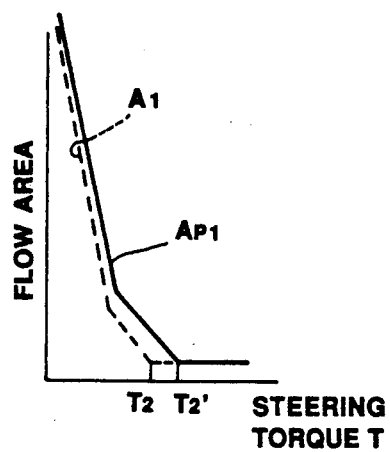
FIGS. 6(a), 6(b), and 6(c) show how flow or pressure differential vary versus steering torque T.
Figure 6:
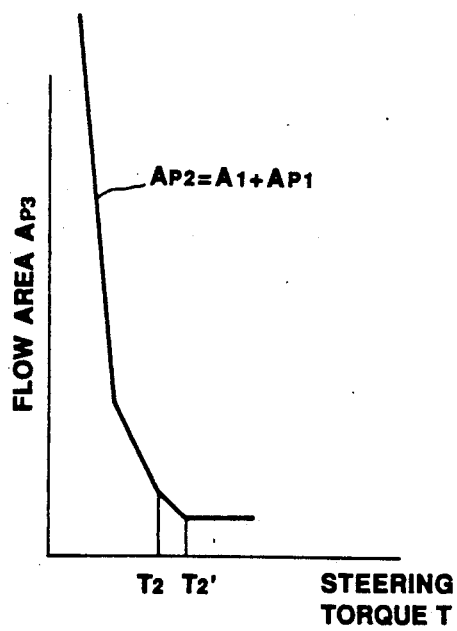
Figure 6:
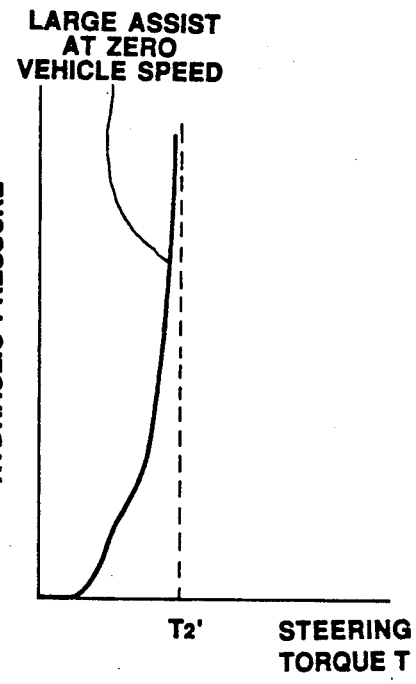

FIG. 6(c) shows the variation in the differential pressure occurring between the left and right pressure chambers 12L and 12R of the power cylinder 12 versus steering torque T. From this relation, it will be readily understood that a relatively large power assist is generated for a relatively small steering torque, thus relieving an operator of a load imposed upon manipulating the steering wheel 15.

When the steering wheel 15 is turned clockwise, this clockwise rotation of the steering wheel 15 causes the flow areas of the corresponding variable flow restrictors 1R, 2R and 3R to decrease, respectively, so that the operator can manipulate the steering wheel 15 with a light steering effort.

When the vehicle is travelling, the externally controlled variable flow restrictor 4 has its flow area to vary in accordance with a characteristic as shown in FIG. 2(d), since the controller 17 controls the current $I_V$ supplied to the solenoid 31 of the spool valve 30 in response to vehicle speed indicative signal $V_D$ generated by the vehicle speed sensor 16.

If, under this condition, the steering wheel 15 is placed at the above-mentioned central rest position, the primary variable flow restrictors 1L, 1R, 2L, 2R, and the secondary variable flow restrictors 3L, 3R are fully opened. Thus, the hydraulic fluid supplied to the distributor circuit 14 splits evenly into two branch flows, one passing through the first path $L_1$-$L_2$ and the other passing through the second path $L_4$-$L_3$, causing no pressure differential between the left and right pressure chambers 12L and 12R of the power cylinder 12. Thus, no power assist is induced.

Figure 7A:
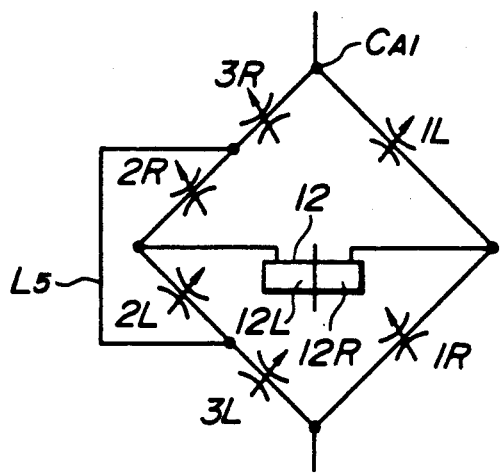
FIGS. 7(a), 7(b), 7(c), and 7(d) are equivalent circuits illustrating operation of the first embodiment at high vehicle speed.

When the vehicle speed is high, the externally controlled variable flow restrictor 4 is fully opened and thus the bypass line $L_5$ is fully opened. The hydraulic distributor circuit 14 under this condition can be expressed by an equivalent circuit as shown in FIG. 7(a).

Figure 7B:
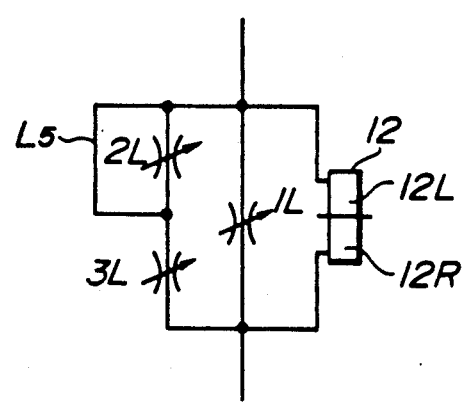
Figure 7C:
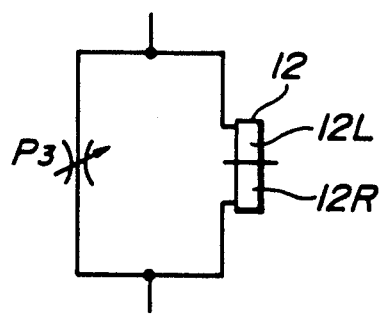
Figure 8:
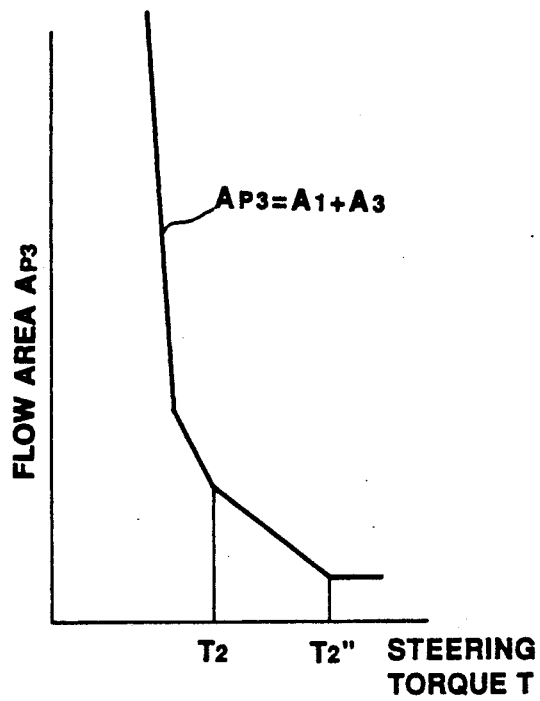
FIGS. 8(a) and 8(b) are graphs illustrating how flow area or pressure differential vary versus steering torque T.
Figure 8:
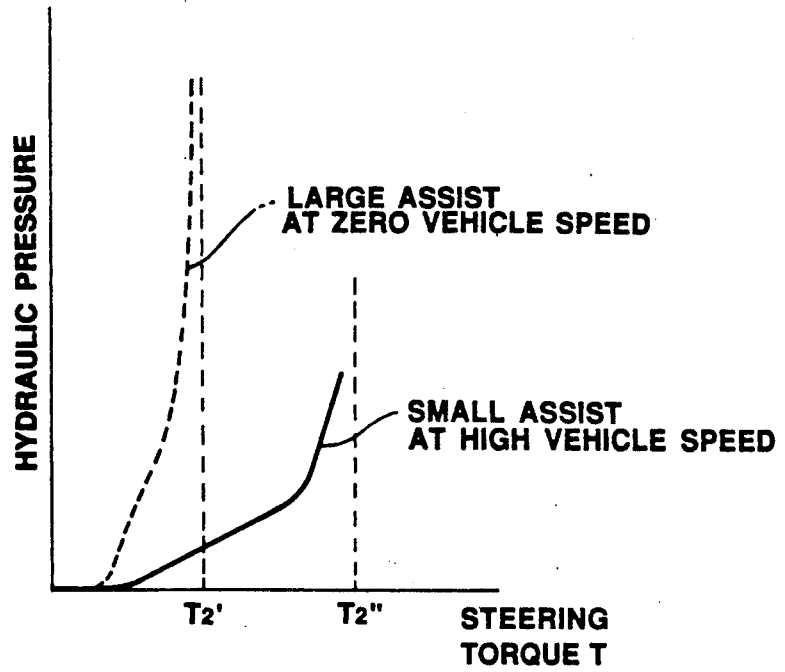

If, in this state, the steering wheel 15 is turned counterclockwise, the flow areas of the primary variable flow restrictors 1L and 2L and the secondary variable flow restrictor 3L decrease although the other variable flow restrictors 1R, 2R, and 3R are kept fully opened. The equivalent circuit shown in FIG. 7(a) may be converted to the circuit as shown in FIG. 7(b). With the bypass line $L_5$ being fully opened, the primary variable flow restrictor 2L arranged in parallel to the bypass line $L_5$ can be neglected. If the primary variable flow restrictor 1L and the secondary variable flow restrictor 3L are expressed by an equivalent variable flow restrictor $P_3$, the distributor circuit 14 can be expressed by an equivalent circuit as shown in FIG. 7(c). The flow area $A_{P3}$ of the equivalent variable flow restrictor $P_3$ varies versus steering torque T in the pattern as shown in FIG. 8(a). As is readily seen from FIG. 8(a), the flow area $A_{P3}$ is the sum of the flow areas $A_1$ and $A_3$ of the variable flow restrictors 1L and 3L.

Thus, at high vehicle speed, a pressure differential between the left and right pressure chambers 12L and 12R varies versus steering torque T along the fully drawn curve as shown in FIG. 8(b). Thus, in the case of making a lane change at high vehicle speed on a highway, the degree of power assist is low, assuring safe on-center driving.

Besides, if, at high vehicle speed, the driver turns the steering wheel 15 with a large steering torque for avoidance of collision with an obstacle immediately after he finds the obstacle on his way, the rate of flow of hydraulic fluid passing through the bypass line $L_5$ decreases, since the flow area of the secondary variable flow restrictor 3L decreases. This causes an increased pressure differential generated between the left and right pressure chambers 12L and 12R of the power cylinder 12, inducing an increased power assist. Thus, smooth turning of the steering wheel 15 is assured.

Figure 7D:
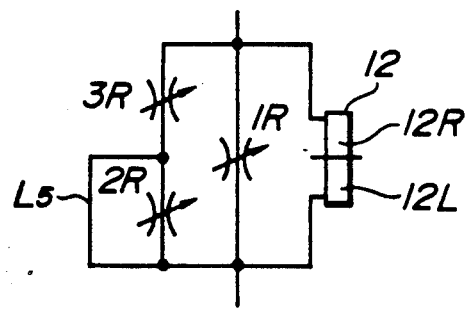

When the steering wheel 15 is turned counterclockwise at high vehicle speed, the circuit shown in FIG. 7(a) is converted into a circuit shown in FIG. 7(d). Thus, substantially the same steering characteristic as obtained during clockwise turning is provided.

At low or middle vehicle speed, there is provided a power assist characteristic falling between the power assist characteristic at high vehicle speed illustrated by the fully drawn curve and the power assist characteristic at zero vehicle speed illustrated by the broken curve in FIG. 8(b). The power assist characteristic shifts from the broken curve to the fully drawn curve as vehicle speed V increases, since the flow area $A_4$ increases in the pattern as illustrated in FIG. 2(d).

From the preceding description, it will now be appreciated that the hydraulic fluid passes through the bypass line $L_5$ in one direction only regardless of which direction the steering wheel 15 is turned. Thus, substantially the same power assist characteristic is assured regardless of which direction the steering wheel 15 is turned, since the hydraulic fluid passes through the externally controlled variable flow restrictor in one direction only.

Different embodiments are described.

Figure 9:
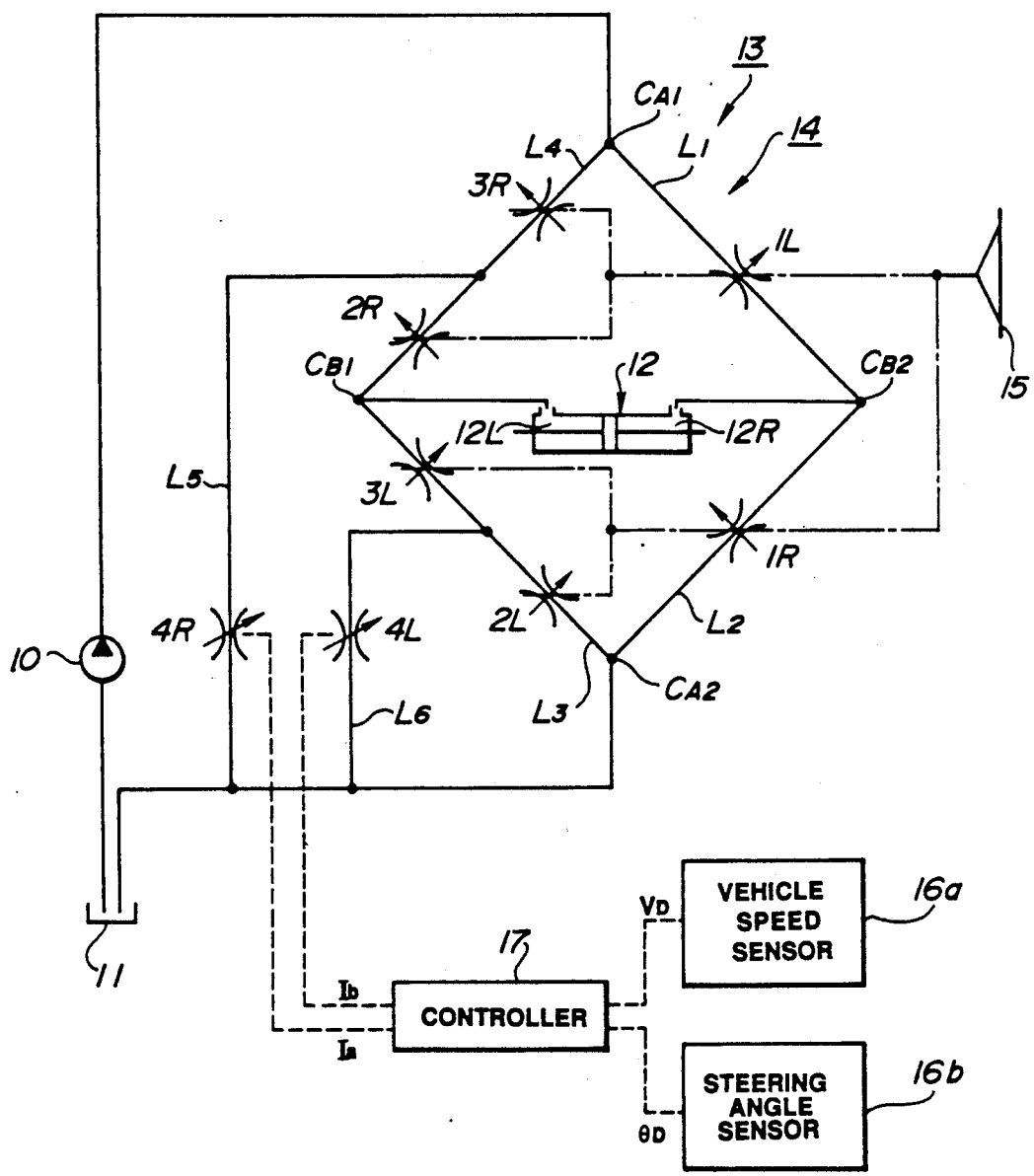
FIG. 9 is a similar view to FIG. 1 showing a second embodiment of a control valve.

Referring to FIG. 9, the second embodiment is described. This embodiment is substantially the same as the first embodiment except that a secondary variable flow restrictor 3L of an outflow section $L_3$ of a second fluid flow path $L_4$-$L_3$ is disposed upstream a primary variable flow restrictor 2L disposed therein. Another difference is that the bypass means include a first bypass line $L_5$ having one end communicating with the inflow section $L_4$ at a portion between secondary and primary variable flow restrictors 3R and 2R of the inflow section $L_4$ and an opposite end communicating with a reservoir tank (11), and a second bypass line $L_6$ having one end communicating with the outflow section $L_3$ of at a portion between secondary and primary variable flow restrictors 3L and 2L of the outflow section $L_3$. Disposed in the first bypass line $L_5$ and the second bypass line $L_6$ are a first externally controlled variable flow restrictor 4R and a second externally controlled variable flow restrictor 4L.

The flow areas $A_4$ of the first and second externally controlled variable flow restrictors 4R and 4L varied by solenoids which are energized in response to solenoid currents $I_a$ and $I_b$ controlled by a controller 17. The controller 17 is supplied with a steering wheel angle indicative signal $\theta_D$ generated by a steering angle sensor 16b in addition to a vehicle speed indicative signal $V_D$ generated by a vehicle speed sensor 16a. The controller 17 determines based on the signal $\theta_D$ which direction a steering wheel 15 is being turned. The controller 17 allows the current $I_a$ to pass through the solenoid of the first externally controlled variable flow restrictor 4R only when the steering wheel 15 is manipulated clockwise, and allows the current $I_b$ to pass through the solenoid of the second externally controlled variable flow restrictor 4L only when the steering wheel 15 is manipulated counterclockwise. The intensity of the currents $I_a$ and $I_b$ is variable in the same predetermined pattern versus the vehicle speed indicative signal $V_D$. Thus, the flow area $A_4$ of first externally controlled variable flow restrictor 4R is substantially zero during manipulation of the steering wheel 15 counterclockwise, but increases in response to the vehicle speed V in the manner as shown in FIG. 2(d) during manipulation of the steering wheel 15 clockwise. The flow area $A_4$ of the second externally controlled variable flow restrictor 4L is substantially zero during manipulation of the steering wheel 15 clockwise, but increases in response to the vehicle speed V in the same manner as shown in FIG. 2(d) during manipulation of the steering wheel 15 counterclockwise.

Figure 10:
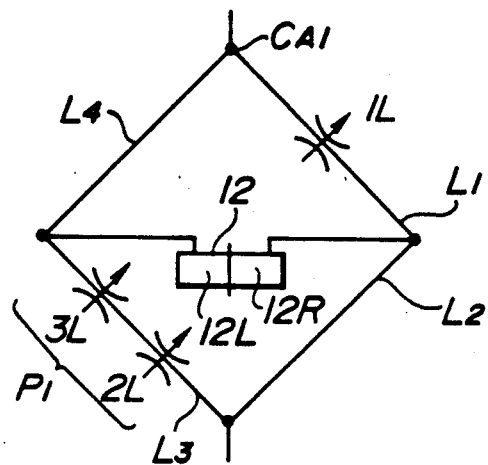
FIGS. 10(a), 10(b), and 10(c) are similar views to FIGS. 5(a), 5(b), and 5(c), respectively, and show equivalent circuits illustrating operation of the second embodiment at zero vehicle speed.
Figure 10:
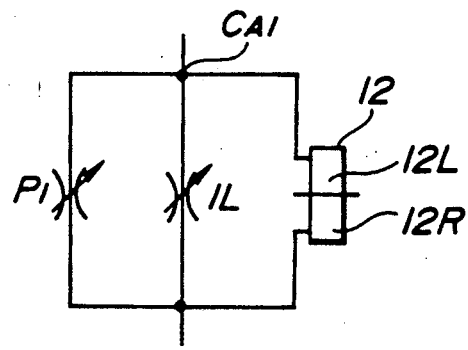
Figure 10:
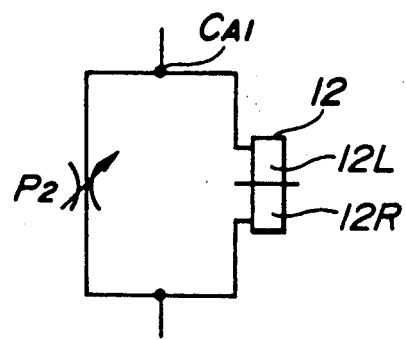

FIGS. 10(a), 10(b), and 10(c) are equivalent circuits illustrating the operation of the second embodiment during manipulation of the steering wheel 15 counterclockwise at zero vehicle speed. These Figures corresponds to FIGS. 5(a), 5(b), and 5(c) for the first embodiment, respectively.

Figure 11:
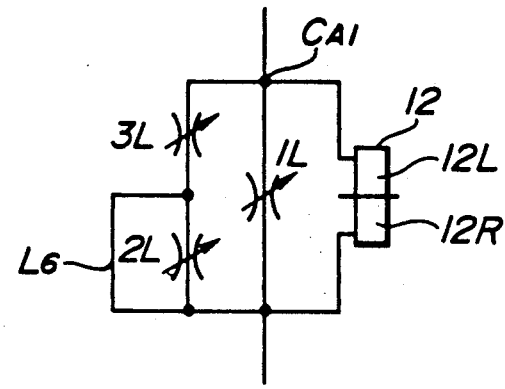
FIGS. 11(a), 11(b), and 11(c) are similar views to FIGS. 7(b), 7(c), and 7(d), and show equivalent circuits illustrating operation of the second embodiment at high vehicle speed.
Figure 11:
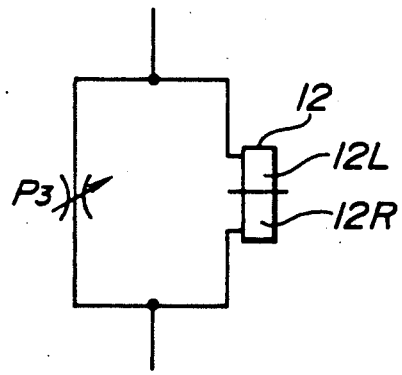
Figure 11:
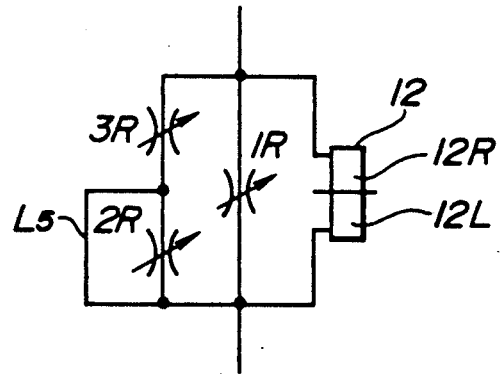

FIGS. 11(a), 11(b), and 11(c) correspond to FIGS. 7(b), 7(c), and 7(d) for the first embodiment, respectively, and illustrate operation of the second embodiment during manipulation of the steering wheel 15 counterclockwise at high vehicle speed, see FIG. 11(a), and during manipulation of the steering wheel 15 clockwise at high vehicle speed, see FIG. 11(c).

Figure 12:
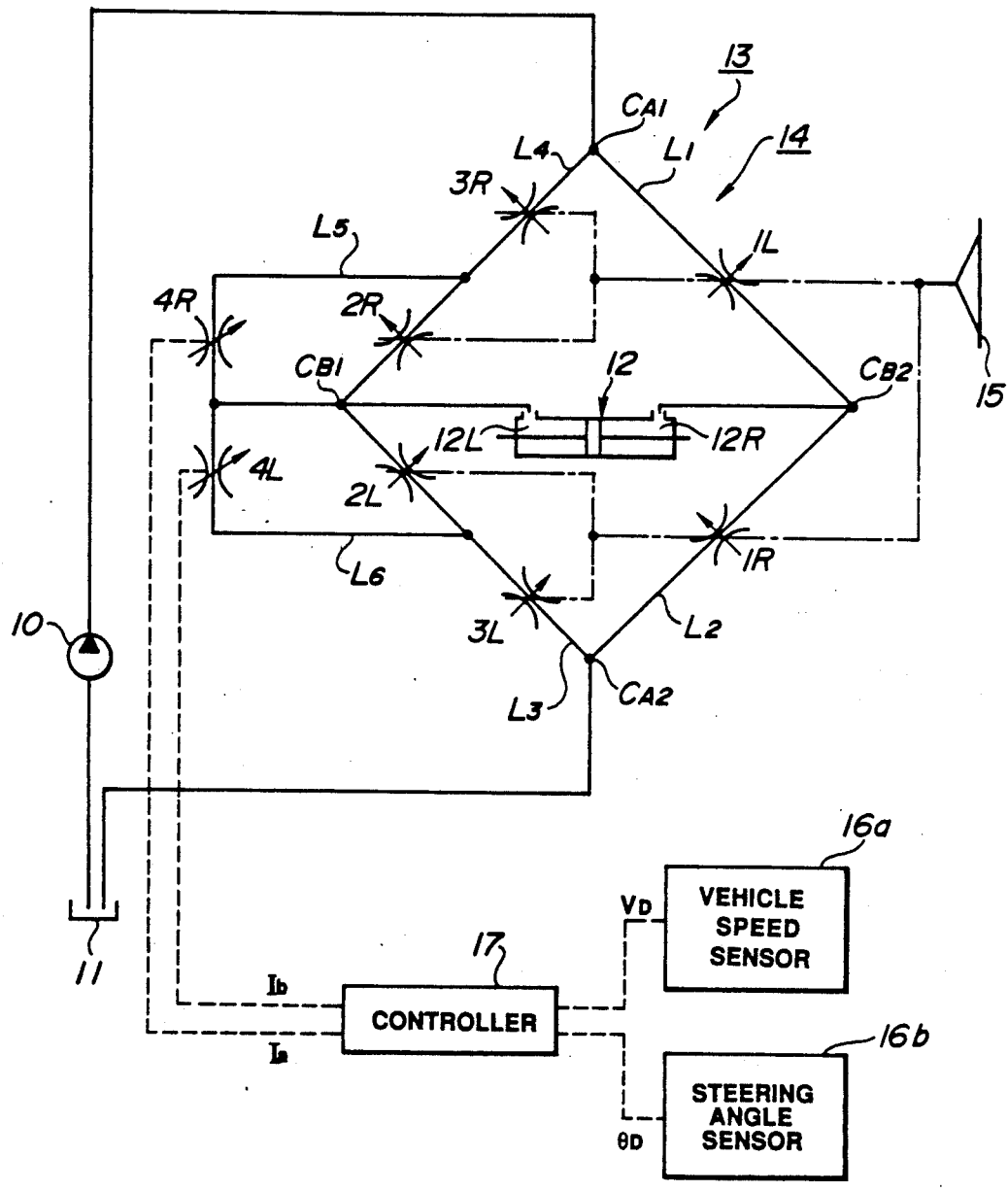
FIG. 12 is a similar view to FIG. 1 showing a third embodiment of a control valve.

The third embodiment is described in connection with FIG. 12. Referring to FIG. 12, this embodiment is substantially the same as the first embodiment except that the bypass means include a first bypass line $L_5$ having one end communicating with an inflow section $L_4$ of second path $L_4$-$L_3$ at a portion between secondary and primary variable flow restrictors 3R and 2R, and a second bypass line $L_6$ having one end communicating with the connection portion $C_{B1}$ of the second path $L_4$-$L_3$ and an opposite end communicating with an outflow section $L_3$ of the second path $L_4$-$L_3$ at a portion between primary and secondary variable flow restrictors 2L and 3L. Disposed in the first and second bypass lines $L_5$ and $L_6$ are first and second externally controlled variable flow restrictors 4R and 4L substantially the same as their counterparts in the second embodiment (see FIG. 9).

Figure 13:
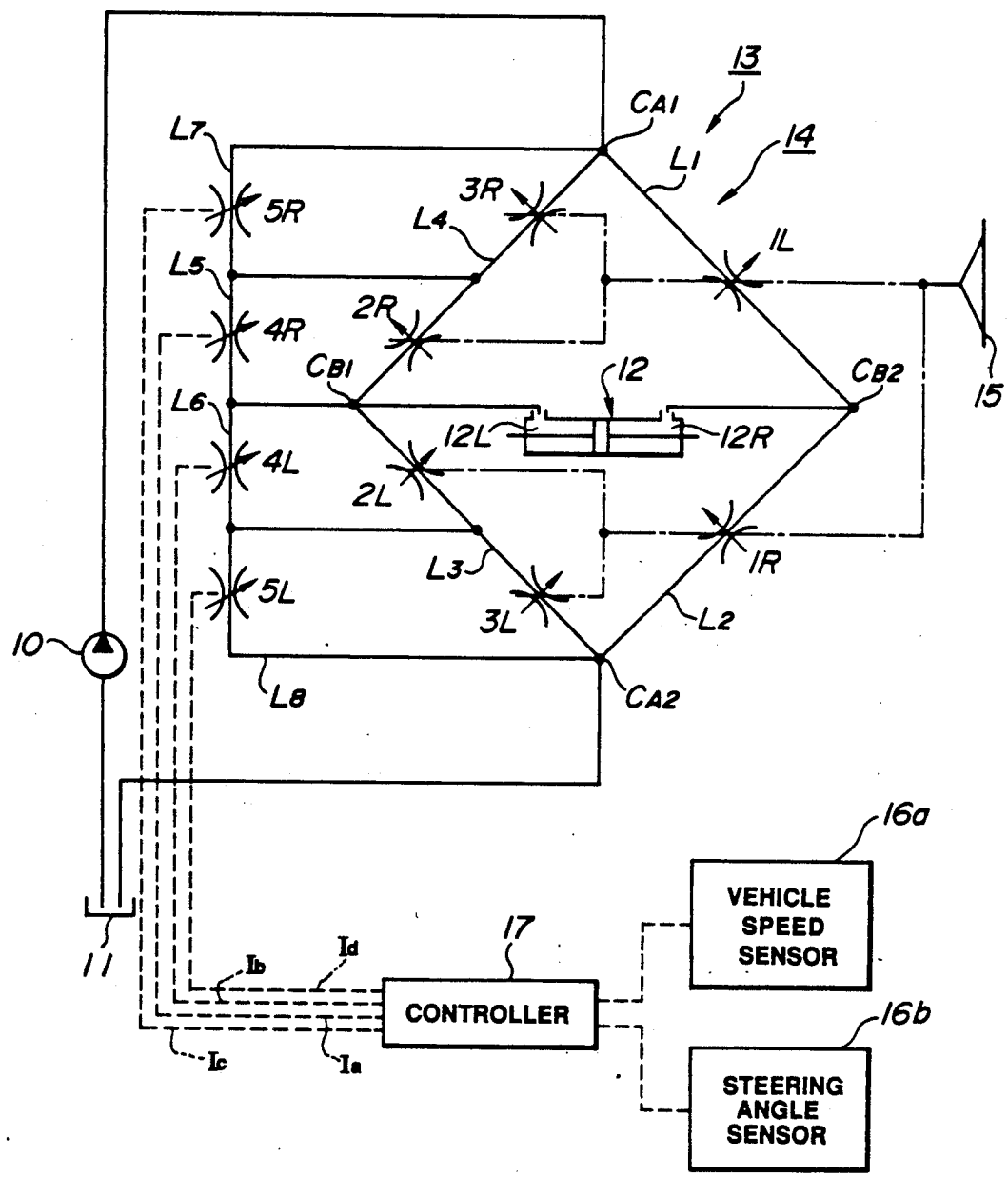
FIG. 13 is a similar view to FIG. 1 showing a fourth embodiment of a control valve.

The fourth embodiment shown in FIG. 13 is an modified version of the third embodiment shown in FIG. 12. Thus, the fourth embodiment is substantially the same as the third embodiment except the provision of a third bypass line $L_7$ with a third externally controlled variable flow restrictor 5R, and a fourth bypass line L$_8$ with a fourth externally controlled variable flow restrictor 5L.

Figure 14A:
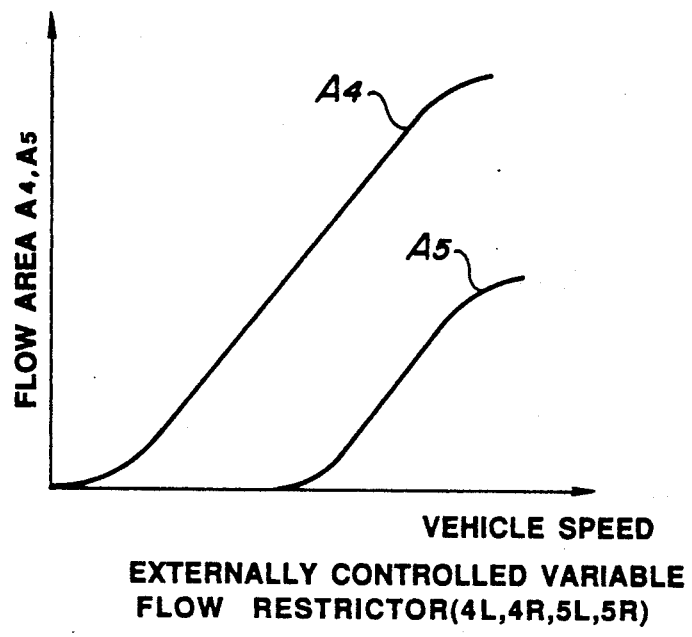
FIGS. 14(a) and 14(b) are graphs illustrating how flow area and pressure differential vary versus vehicle speed V and steering torque T.

The third bypass line L$_7$ has one end connected to a pump 10 and an opposite end connected to an inflow section L$_4$ of second path L$_4$-L$_3$ at the portion between secondary and primary variable flow restrictors 3R and 2R of the inflow section L$_4$. The fourth bypass line L$_8$ has one end communicating with an outflow section L$_3$ of the second path L$_4$-L$_3$ at the portion between primary and secondary variable flow restrictors 2L and 3L of an outflow section L$_3$ of the second path L$_4$-L$_3$ and an opposite end connected to a reservoir tank 11. The third and fourth externally controlled variable flow restrictor 5R and 5L have flow areas A$_5$ variable by solenoids, respectively. These solenoids are energized by electric currents I$_c$ and I$_d$ supplied by a controller 17. The flow area A$_5$ of the third externally controlled variable flow restrictor 5R is substantially zero during manipulation of a steering wheel 15 counterclockwise, since no electric current is fed to the solenoid of the flow restrictor 5R. But, it increases in response to vehicle speed V in the manner as illustrated in FIG. 14(a) after the vehicle speed V has exceeded a predetermined intermediate vehicle speed value during manipulation of the steering wheel 15 clockwise. The flow area A$_5$ of the fourth externally controlled variable flow restrictor 5L is substantially zero during manipulation of the steering wheel 15 clockwise. But, it increases in response to the vehicle speed V in the manner as illustrated in FIG. 14(a) after the vehicle speed V has exceeded the predetermined intermediate vehicle speed value during manipulation of the steering wheel 15 counterclockwise.

Figure 14B:
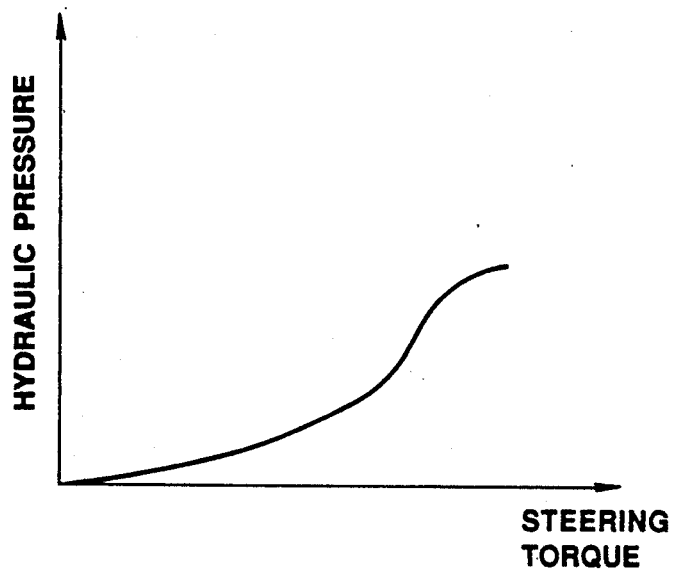

FIG. 14(b) is a differential pressure vs., steering torque characteristic curve and thus a power assist characteristic at high vehicle speed. Comparing this curve with its counterpart in FIG. 8(b) reveals that smaller power assist is provided at high vehicle speed although substantially the same degree of power assist as in the first, second or third embodiment is provided at zero, low or middle vehicle speed.

What is claimed is:

1. A control valve for a variable assist power steering apparatus, the power steering apparatus including a reservoir tank containing a hydraulic fluid, a pump sucking in the hydraulic fluid out of the reservoir tank and discharging the hydraulic fluid, a manually operable steering wheel, and a hydraulic operated power cylinder, the control valve comprising:
    a first valve element;
    a second valve element;
    means operatively interconnecting said first and second valve elements for allowing said second valve element to displace relative to said first valve element in one direction during manipulation of the steering wheel in one direction in response to a magnitude of steering torque applied to the steering wheel and in the opposite direction during displacement of the steering wheel in the opposite direction in response to a magnitude of steering torque applied to the steering wheel;
    said first and second valve elements defining therebetween first and second parallel fluid flow paths connected between the pump and the reservoir tank,
    said first and second parallel fluid flow paths including connection portions, respectively, which are connected to the power cylinder, each of said first and second paths being divided by said connection portion thereof into an inflow section upstream the power cylinder and an outflow section downstream the power cylinder,
    said inflow section of said first path and said outflow section of said second path including primary variable flow restrictors, respectively, having flow areas which decrease during displacement of said second valve element relative to said first valve element in said one direction, said inflow section of said second path and said outflow section of said first path including primary variable flow restrictors, respectively, having flow areas which decrease during displacement of said second valve element relative to said first valve element in said opposite direction,
    said inflow and outflow sections of said second path including secondary variable flow restrictors, respectively,
    said secondary variable flow restrictor of said inflow section of said second path having a flow area which decreases during displacement of said second valve element relative to said first valve element in said opposite direction,
    said secondary variable flow restrictor of said outflow section of said second parallel fluid circuit having a flow area which decreases during displacement of said second valve element relative to said first valve element in said one direction,
    said flow areas of said primary and secondary variable flow restrictors of each of said inflow and outflow sections of said second path being variable in different patterns in response to the magnitude of steering torque applied to the steering wheel;
    the pattern of variation of said flow area of said primary variable flow restrictor of said inflow section of said first path during displacement of said second valve element relative to said first valve element in said one direction being substantially the same as the pattern of variation of said flow area of said primary variable flow restrictor of said outflow section of said first flow path during displacement of said second valve element relative to said first valve element in said opposite direction;
    bypass means connected to said second path in parallel to said primary variable flow restrictors and in series with said secondary variable flow restrictors for passing hydraulic fluid therethrough in one direction only; and
    externally controlled means for varying flow of hydraulic fluid passing through said bypass means in response to a predetermined variable different from the steering torque.

2. A control valve as claimed in claim 1, wherein during manipulation of the steering wheel in said opposite direction inducing displacement of said second valve element relative to said first valve element in said the opposite direction, said flow area of said primary variable flow restrictor of said inflow section of said second path is always less than said flow area of said secondary variable flow restrictor of said inflow section of said second path, and decreases to substantially zero at a first predetermined steering torque value before said flow area of said secondary variable flow restrictor of said inflow section of said second path decreases to substantially zero at a second predetermined steering torque value which is greater than said first predetermined steering torque value; and during manipulation of the steering wheel in said one direction, inducing displacement of said second valve element relative to said first valve element in said one direction, said flow area of said primary variable flow restrictor of said outflow section of said second path is always less than said flow area of said secondary variable flow restrictor of said outflow section of said second path, and decreases to substantially zero at said first predetermined steering torque value before said flow area of said secondary variable flow restrictor of said outflow section of said second path decreases to substantially zero at said second predetermined steering torque value.

3. A control valve as claimed in claim 1, wherein said secondary variable flow restrictor of said inflow section of said second path is disposed upstream said primary variable flow restrictor thereof, and said secondary variable flow restrictor of said outflow section of said second path is disposed downstream said primary variable flow restrictor thereof.

4. A control valve as claimed in claim 3, wherein said bypass means include a bypass line having one end communicating with said inflow section of said second path at a portion between said secondary and primary variable flow restrictors disposed in said inflow section of said second path and an opposite end communicating with said outflow section of said second path at a portion between said secondary and primary variable flow restrictors disposed in said outflow section of said second path.

5. A control valve as claimed in claim 4, wherein said flow areas of said primary variable flow restrictors of said inflow and outflow sections of said first path are variable in the same pattern in response to magnitude of steering torque applied to the steering wheel.

6. A control valve as claimed in claim 5, wherein said flow areas of said primary variable flow restrictors of said inflow and outflow sections are variable in the same pattern in response to magnitude of steering torque applied to the steering wheel.

7. A control valve as claimed in claim 1, wherein said secondary variable flow restrictor of said inflow section of said second path is disposed upstream said primary variable flow restrictor thereof, and said secondary variable flow restrictor of said outflow section of said second path is disposed upstream said primary variable flow restrictor thereof.

8. A control valve as claimed in claim 7, wherein said bypass means include a first bypass line having one end communicating with said inflow section of said second path at a portion between said secondary and primary variable flow restrictors of said inflow section of said second path and an opposite end communicating with said reservoir tank, and a second bypass line having one end communicating with said outflow section of said second path at a portion between said secondary and primary variable flow restrictors of said outflow section of said second path.

9. A control valve as claimed in claim 8, wherein said externally controlled means include a first externally controlled variable flow restrictor disposed in said first bypass line and a second externally controlled variable flow restrictor disposed in said second bypass line, said first externally controlled variable flow restrictor having a flow area which is substantially zero during manipulation of the steering wheel in said one direction, but increases in response to said predetermined variable during manipulation of steering wheel in said the opposite direction, said second externally controlled variable flow restrictor having a flow area which is substantially zero during manipulation of the steering wheel in said the opposite direction, but increases in response to said predetermined variable during manipulation of the steering wheel in said one direction.

10. A control valve as claimed in claim 3, wherein said bypass means include a first bypass line having one end communicating with said inflow section of said second path at a portion between said secondary and primary variable flow restrictors of said inflow section of said second path and an opposite end communicating with said connection portion of said second path, and a second bypass line having one end communicating with said connection portion of said second path and an opposite end communicating with said outflow section of said second path at a portion between said primary and secondary variable flow restrictors of said outflow section of said second path.

11. A control valve as claimed in claim 10, wherein said externally controlled means include a first externally controlled variable flow restrictor disposed in said first bypass line and a second externally controlled variable flow restrictor disposed in said second bypass line, said first externally controlled variable flow restrictor having a flow area which is substantially zero during manipulation of the steering wheel in said one direction, but increases in response to said predetermined variable during manipulation of the steering wheel in said opposite direction, said second externally controlled variable flow restrictor having a flow area which is substantially zero during manipulation of the steering wheel in said opposite direction, but increases in response to said predetermined variable during manipulation of the steering wheel in said one direction.

12. A control valve as claimed in claim 9, wherein a third bypass line having one end connected to said pump and an opposite end connected to said inflow section of said second path at said portion between said secondary and primary variable flow restrictors of said inflow section of said second path;

a fourth bypass line having one end communicating with said outflow section of said second path at said portion between said primary and secondary variable flow restrictors of said outflow section of said second path and an opposite end connected to said reservoir tank;

a third externally controlled variable flow restrictor disposed in said third bypass line; and a fourth externally controlled variable flow restrictor disposed in said fourth bypass line, said third externally controlled variable flow restrictor having a flow area which is substantially zero during manipulation of the steering wheel in said one direction, but increases in response to said predetermined variable during manipulation of the steering wheel in said other direction, said fourth externally controlled variable flow restrictor having a flow area which is substantially zero during manipulation of the steering wheel in said the opposite direction, but increases in response to said predetermined variable during manipulation of the steering wheel in said one direction.

* * * * *